(12) United States Patent
Lee et al.

(10) Patent No.: US 9,383,781 B2
(45) Date of Patent: Jul. 5, 2016

(54) TOUCH SENSOR

(71) Applicant: SAMSUNG ELECTRO-MECHANICS CO., LTD., Suwon-Si (KR)

(72) Inventors: Jin Uk Lee, Suwon-Si (KR); Nam Keun Oh, Suwon-Si (KR); Seung Joo Shin, Suwon-Si (KR); Jang Ho Park, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 183 days.

(21) Appl. No.: 14/452,514

(22) Filed: Aug. 5, 2014

(65) Prior Publication Data
US 2015/0041301 A1 Feb. 12, 2015

(30) Foreign Application Priority Data

Aug. 6, 2013 (KR) .................. 10-2013-0093099
Jul. 31, 2014 (KR) .................. 10-2014-0098430

(51) Int. Cl.
*H03K 17/96* (2006.01)
*G06F 1/16* (2006.01)
*G06F 3/044* (2006.01)

(52) U.S. Cl.
CPC .............. *G06F 1/1692* (2013.01); *G06F 3/044* (2013.01); *G06F 2203/04112* (2013.01)

(58) Field of Classification Search
CPC .......... G06F 3/044; G06F 2203/04112; G06F 1/1692
USPC ................................. 200/5 R, 600; 345/173
See application file for complete search history.

(56) References Cited

U.S. PATENT DOCUMENTS

| 8,154,530 | B2* | 4/2012 | Lin .................. G06F 3/044 345/173 |
| 8,269,744 | B2* | 9/2012 | Agari ................ G06F 3/044 345/173 |
| 8,599,150 | B2* | 12/2013 | Philipp .............. G06F 3/044 178/18.01 |

(Continued)

FOREIGN PATENT DOCUMENTS

| JP | 7-6827 U | 1/1995 |
| JP | 2007-249669 A | 9/2007 |

(Continued)

OTHER PUBLICATIONS

Japanese Office Action issued on Jun. 2, 2015, in counterpart Japanese Application No. 2014-160529 (6 pages in English, 4 pages in Japanese).
Korean Office Action issued Nov. 13, 2015 in counterpart Korean Application No. KR 10-2014-0098430 (11 pages, in Korean, with English language translation).

*Primary Examiner* — Edwin A. Leon
(74) *Attorney, Agent, or Firm* — NSIP Law (57) ABSTRACT

There is provided a touch sensor including: a base substrate; a first electrode pattern formed on the base substrate and including first electrode lines repeatedly arranged in parallel with each other; and a second electrode pattern formed on a surface spaced apart from a surface on which the first electrode pattern is formed and including second electrode lines intersecting with the first electrode lines and repeatedly arranged in parallel with each other, wherein an extension line connecting intersection points between the first and second electrode lines to each other is formed as an oblique line with respect to a horizontal direction.

14 Claims, 7 Drawing Sheets

(56) References Cited

U.S. PATENT DOCUMENTS

| | | | |
|---|---|---|---|
| 8,698,767 B2* | 4/2014 | Kwak | G06F 3/044 178/18.05 |
| 2008/0225011 A1 | 9/2008 | Ito | |
| 2011/0291966 A1 | 12/2011 | Takao et al. | |
| 2013/0082964 A1* | 4/2013 | Agari | G06F 3/044 345/173 |
| 2013/0135222 A1 | 5/2013 | Kim et al. | |
| 2013/0161177 A1 | 6/2013 | Lee et al. | |
| 2013/0242485 A1 | 9/2013 | Ohtani et al. | |

FOREIGN PATENT DOCUMENTS

| | | |
|---|---|---|
| JP | 2010-39537 A | 2/2010 |
| JP | 2011-175412 A | 9/2011 |
| JP | 2011-248722 A | 12/2011 |
| JP | 2012-103761 A | 5/2012 |
| JP | 3183253 U | 4/2013 |
| JP | 2013-114667 A | 6/2013 |
| KR | 10-2013-0058525 A | 6/2013 |
| KR | 10-2013-0071863 A | 7/2013 |

\* cited by examiner

TOUCH SENSOR

CROSS-REFERENCE TO RELATED APPLICATION

This application claims the benefit of Korean Patent Application No. 10-2013-0093099, filed on Aug. 6, 2013, entitled "Touch Sensor" and No. 10-2014-0098430, filed on Jul. 31, 2014, entitled "Touch Sensor", which are hereby incorporated by reference in its entirety into this application.

BACKGROUND

The present disclosure relates to a touch sensor.

In accordance with the growth of computers using a digital technology, devices assisting computers have also been developed, and personal computers, portable transmitters and other personal information processors execute processing of text and graphics using various input devices such as a keyboard and a mouse.

In accordance with the rapid advancement of an information-oriented society, the use of computers has gradually been widened. However, it is difficult to efficiently operate products using only a keyboard and a mouse currently serving as an input device. Therefore, the necessity for a device that is simple, has a less malfunction, and is capable of easily inputting information has increased.

In addition, techniques for input devices have progressed toward techniques related to high reliability, durability, innovation, designing and processing beyond a level of satisfying general functions. To this end, a touch sensor has been developed as an input device capable of inputting information such as text, graphics, or the like.

The touch sensor is mounted on a display surface of an image display device such as an electronic organizer, a flat panel display device including a liquid crystal display (LCD) device, a plasma display panel (PDP), an electroluminescence (EL) element, or the like, or a cathode ray tube (CRT) to allow a user to select desired information while viewing the image display device.

The touch sensor is classified into a resistive type touch sensor, a capacitive type touch sensor, an electromagnetic type touch sensor, a surface acoustic wave (SAW) type touch sensor, and an infrared type touch sensor. These various types of touch sensors are adapted for electronic products in consideration of a signal amplification problem, a resolution difference, a level of difficulty of designing and processing technologies, optical characteristics, electrical characteristics, mechanical characteristics, resistance to an environment, input characteristics, durability, and economic efficiency. Currently, the resistive type touch sensor and the capacitive type touch sensor have been prominently used in a wide range of fields.

In this touch sensor, when X electrode patterns and Y electrode patterns are overlapped with each other, a moiré phenomenon is generated in electrodes formed on the respective patterns. In order to decrease the moiré phenomenon, as disclosed in Korean Patent Laid-Open Publication No. 10-2013-0058525 entitled 'Touch Sensor', a study on improvement of shapes of various electrode patterns has been conducted.

PRIOR ART DOCUMENT

Patent Document (Patent Document 1) KR10-2013-0058525 A

SUMMARY

An aspect of the present disclosure may provide a touch sensor capable of decreasing a moiré phenomenon with a display part and more easily securing reliability of alignment between electrode patterns in the case in which two-layer electrode patterns are stacked, by appropriately changing shapes of mesh electrode patterns.

An aspect of the present disclosure may also provide a touch sensor capable of having improved visibility by effectively setting extension directions of the respective unit electrode lines configuring mesh electrode patterns or directions of extension lines connecting intersection points between the unit electrode lines to each other and gradients determining each direction in order to prevent a moiré phenomenon with a black matrix of a stacked display part.

According to an aspect of the present disclosure, there is provided a touch sensor including: a base substrate; a first electrode pattern formed on the base substrate and including first electrode lines repeatedly arranged in parallel with each other; and a second electrode pattern formed on a surface spaced apart from a surface on which the first electrode pattern is formed and including second electrode lines intersecting with the first electrode lines and repeatedly arranged in parallel with each other, wherein an extension line connecting intersection points between the first and second electrode lines to each other is formed so as to be inclined as an oblique line with respect to a horizontal line in a horizontal direction.

In the first and second electrode patterns, an absolute value $|\alpha-(180°-\beta)|$ of a difference between an angle $\alpha$ of the first electrode line with respect to an X axis direction of the base substrate and a value obtained by subtracting an angle $\beta$ of a third electrode line with respect to the X axis direction of the base substrate from 180° may be smaller than 60°.

The angle $\alpha$ of the first electrode line with respect to the X axis direction of the base substrate may be in the range of $18° \leq \beta \leq 72°$.

The angle $\beta$ of the third electrode line with respect to the X axis direction of the base substrate may be in the range of $108° \leq \beta \leq 162°$.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, exemplary embodiments of the present disclosure will be described in detail with reference to the accompanying drawings.

Figure 1:
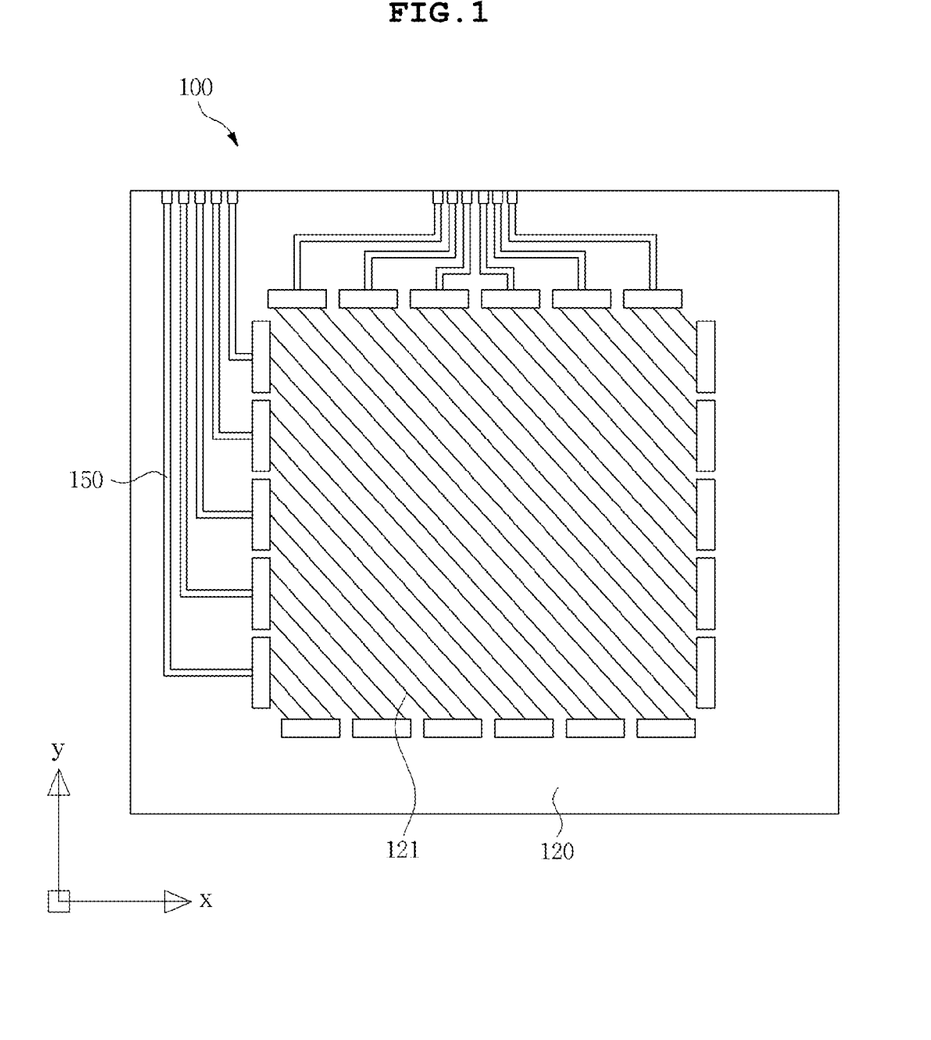
FIG. 1 is a plan view showing a first electrode pattern according to a first exemplary embodiment of the present disclosure.
Figure 2:
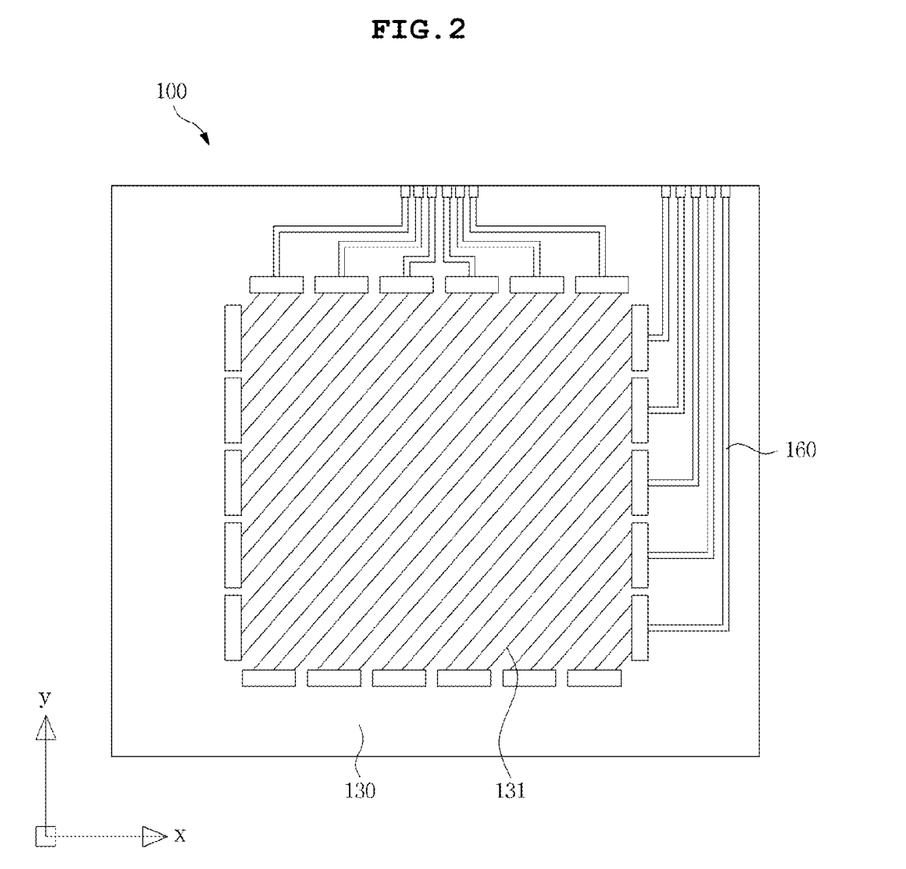
FIG. 2 is a plan view showing a second electrode pattern according to the first exemplary embodiment of the present disclosure.
Figure 3:
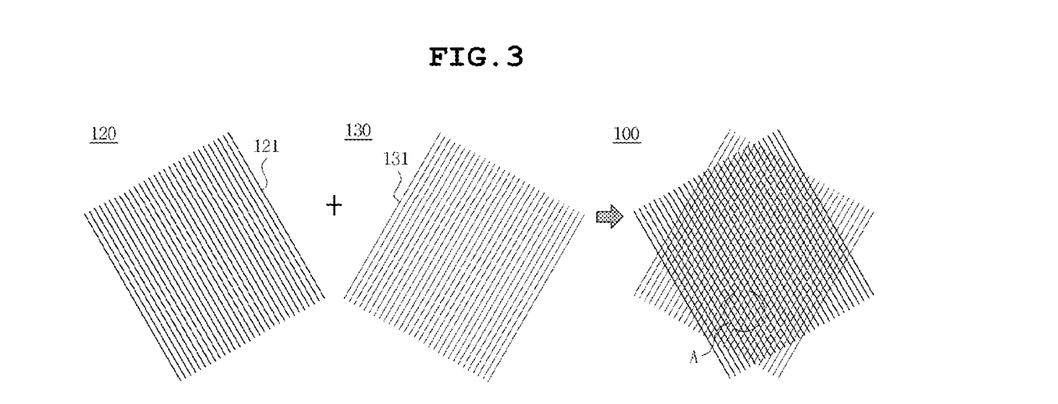
FIG. 3 is an illustrative view of a touch sensor in which the first and second electrode patterns of FIGS. 1 and 2 are coupled to each other.
Figure 4:
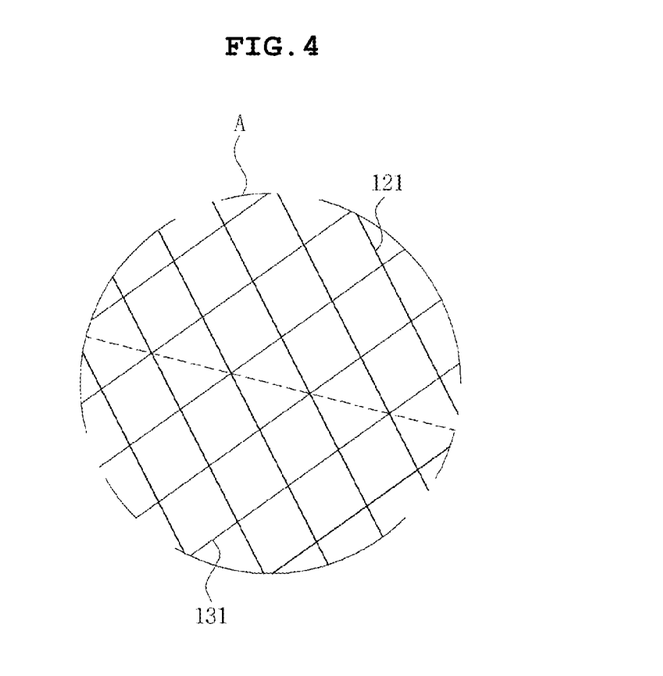
FIG. 4 is an enlarged view of the part A of FIG. 3.
Figure 5:
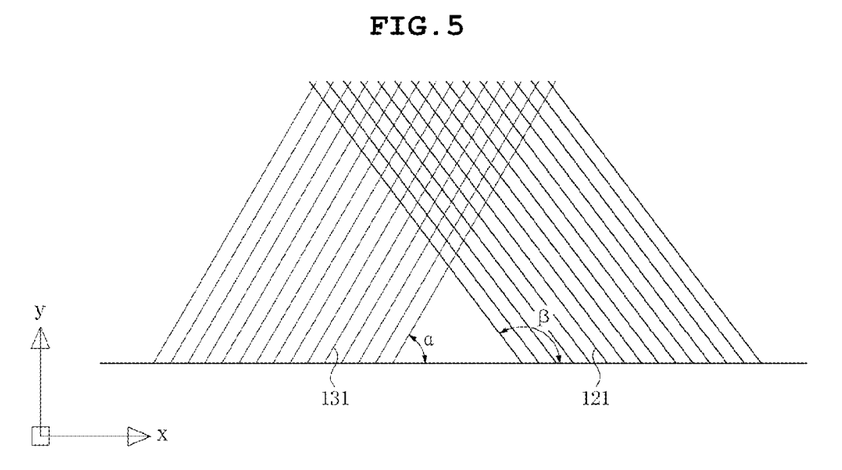
FIG. 5 is an illustrative view showing an angle at which first and second electrode lines intersect with each other in FIG. 3.
Figure 6:
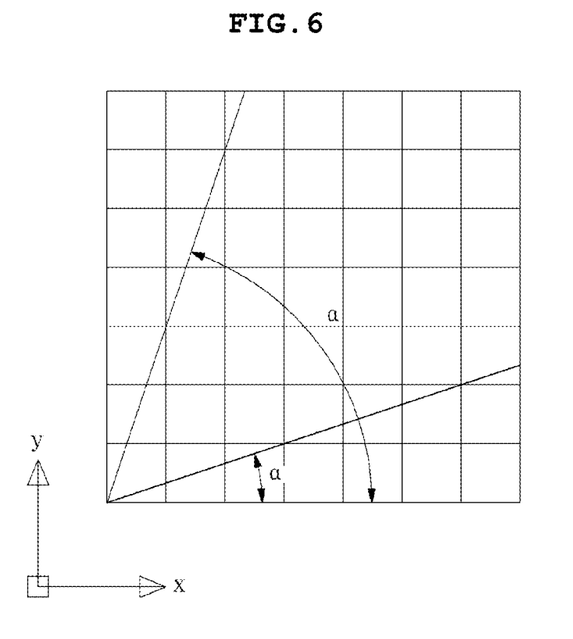
FIG. 6 is an illustrative view showing an angle of the first electrode lines in FIG. 5.
Figure 7:
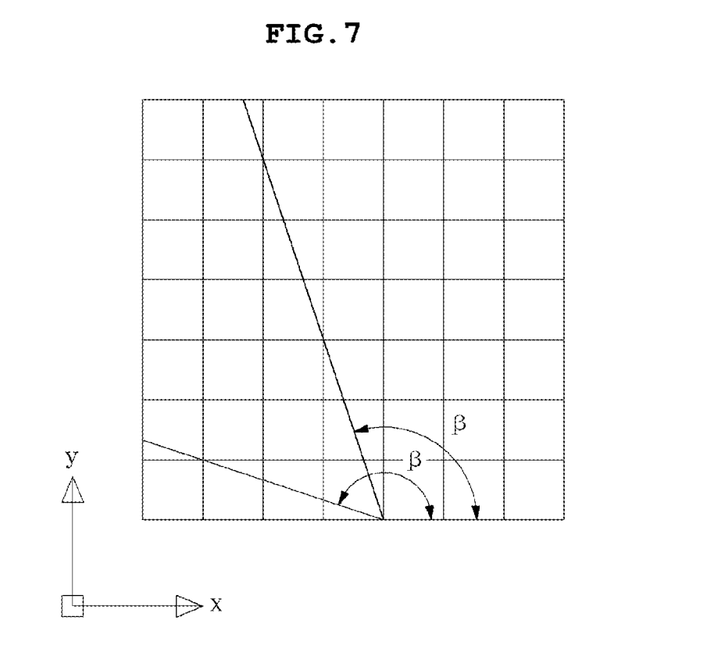
FIG. 7 is an illustrative view showing an angle of the second electrode lines in FIG. 5.
Figure 8:
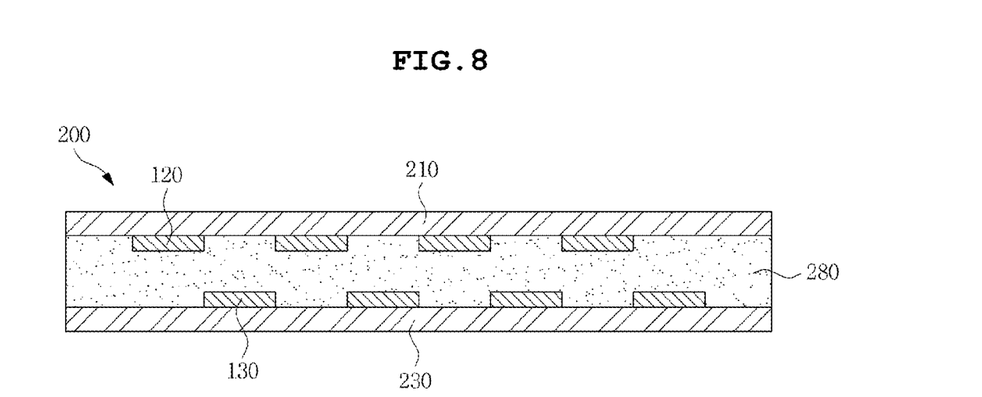
FIG. 8 is a cross-sectional view of a touch sensor according to a second exemplary embodiment of the present disclosure.
Figure 9:
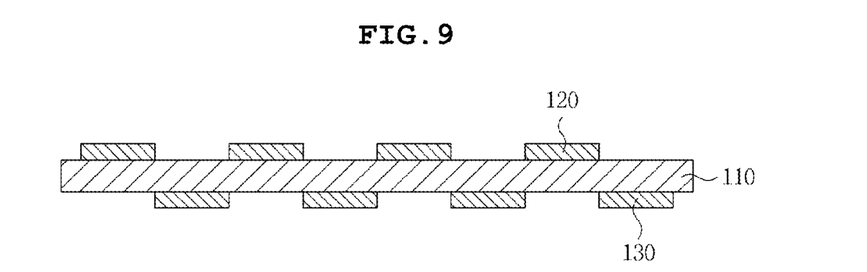
FIG. 9 is a cross-sectional view of a touch sensor according to a third exemplary embodiment of the present disclosure.
Figure 10:
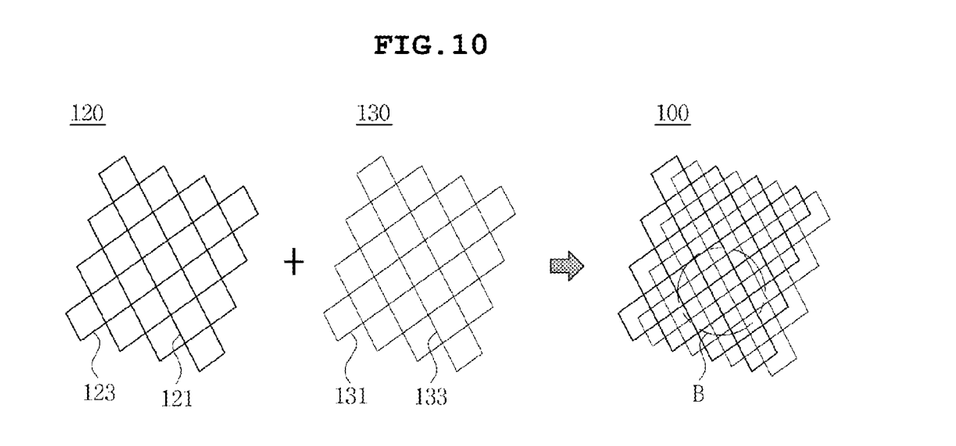
FIG. 10 is an illustrative view of a touch sensor according to a modified example of FIG. 3.
Figure 11:
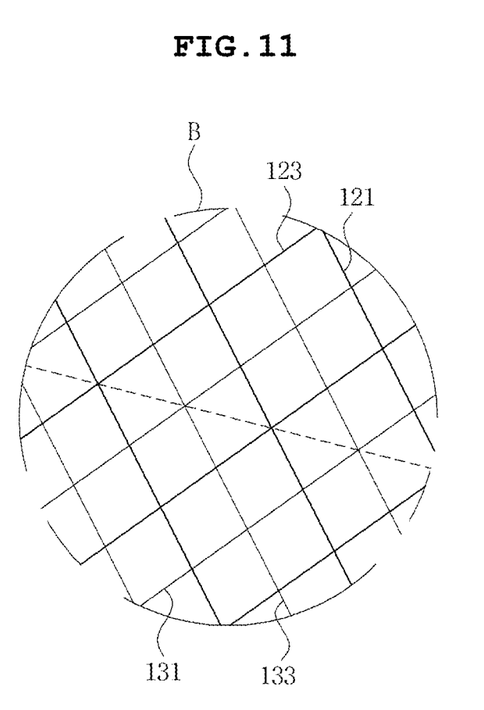
FIG. 11 is an enlarged view of the part B of FIG. 10.

FIG. 1 is a plan view showing a first electrode pattern according to a first exemplary embodiment of the present disclosure; FIG. 2 is a plan view showing a second electrode pattern according to the first exemplary embodiment of the present disclosure; FIG. 3 is an illustrative view of a touch sensor in which the first and second electrode patterns of FIGS. 1 and 2 are coupled to each other; FIG. 4 is an enlarged view of the part A of FIG. 3; FIG. 5 is an illustrative view showing an angle at which first and second electrode lines intersect with each other in FIG. 3; FIG. 6 is an illustrative view showing an angle of the first electrode lines in FIG. 5; FIG. 7 is an illustrative view showing an angle of the second electrode lines in FIG. 5; FIG. 8 is a cross-sectional view of a touch sensor according to a second exemplary embodiment of the present disclosure; FIG. 9 is a cross-sectional view of a touch sensor according to a third exemplary embodiment of the present disclosure; FIG. 10 is an illustrative view of a touch sensor according to a modified example of FIG. 3; and FIG. 11 is an enlarged view of the part B of FIG. 10.

A touch sensor 100 according to an exemplary embodiment of the present disclosure is configured to include a base substrate 110 and first and second electrode patterns 120 and 130 each formed on both surfaces of the base substrate 110.

The base substrate 110 serves to provide a region in which electrode patterns 120 and 130 and electrode wirings 150 and 160 are to be formed. Here, the base substrate 110 is divided into an active region and a bezel region, wherein the active region, which is a portion provided with the electrode patterns 120 and 130 so as to recognize a touch of an input unit, is formed at the center of the base substrate 110 and the bezel region, which is a portion provided with the electrode wirings 150 and 160 extended from the electrode patterns 120 and 130, is formed at an edge of the active region. Here, the base substrate 110 should have support force capable of supporting the electrode patterns 120 and 130 and the electrode wirings 150 and 160 and transparency capable of allowing a user to recognize an image provided by an image display device (not shown). In consideration of the support force and the transparency, the base substrate 110 may be made of polyethyleneterephthalate (PET), polycarbonate (PC), polymethylmethacrylate (PMMA), polyethylenenaphthalate (PEN), polyethersulfone (PES), cyclic olefin copolymer (COC), triacetylcellulose (TAC) film, polyvinyl alcohol (PVA) film, polyimide (PI) film, polystyrene (PS), biaxially oriented polystyrene (BOPS; containing K resin), glass or reinforced glass, or the like, but is not necessarily limited thereto.

FIG. 1 is a plan view showing a first electrode pattern according to a first exemplary embodiment of the present disclosure; and FIG. 2 is a plan view showing a second electrode pattern according to the first exemplary embodiment of the present disclosure. Referring to FIGS. 1 and 2, the electrode patterns 12 and 13, which serve to generate a signal at the time of being touched by an input unit to allow a controller to recognize a touch coordinate, are formed on the base substrate 110. According to the exemplary embodiment of the present disclosure, an electrode pattern formed in an X axis direction of the base substrate 110 will be referred to as a first electrode pattern 120, and an electrode pattern formed in a Y axis direction of the base substrate 110 will be referred to as a second electrode pattern 130.

According to the exemplary embodiment of the present disclosure, first and second electrode lines 121 and 131 are each disposed in the first and second electrode patterns 120 and 130 formed on the base substrate 110. Here, the first and second electrode lines 121 and 131 form an intersection angle with each other to improve visibility. In addition, an aligning process is simplified to improve a yield of a processing process, thereby improving productivity of the touch sensor 100. In the present specification, terms 'X axis direction' or 'Y axis direction' indicating a direction in which the electrode lines are arranged are to assist in the understanding of the present disclosure, the X axis direction and the Y axis direction may intersect with each other and may be formed of horizontal and vertical lines, respectively, and it is defined that references of both directions intersecting with each other coincide with horizontal and vertical extension lines of a black matrix layer vertically and horizontally disposed on a display.

FIG. 3 is an illustrative view of a touch sensor in which the first and second electrode patterns of FIGS. 1 and 2 are coupled to each other; and FIG. 4 is an enlarged view of the part A of FIG. 3. FIG. 5 is an illustrative view showing an angle at which first and second electrode lines intersect with each other in FIG. 3; FIG. 6 is an illustrative view showing an angle of the first electrode lines in FIG. 5; and FIG. 7 is an illustrative view showing an angle of the second electrode lines in FIG. 5. Referring to FIGS. 3 to 7, the first and second electrode patterns 120 and 130 are electrically connected to each other and have first and second electrode lines 121 and 131 forming predetermined patterns, respectively. That is, the first and second electrode lines 121 and 131 are formed to have the predetermined patterns, wherein the respective patterns are electrically connected to each other to form the first and second electrode patterns 120 and 130.

The first electrode lines 121 forming the first electrode pattern 120 are formed as a plurality of lines and in parallel with each other on one surface of the base substrate 110 (See FIG. 3). The first electrode lines 121 may be formed to have a gradient with respect to the X axis direction of the base substrate. That is, the plurality of first electrode lines are disposed in parallel with each other in a state in which they are inclined in the X axis direction by a predetermined angle.

The first and second electrode lines are disposed to intersect with each other. This is to simplify an aligning process of the first and second electrode lines and is to decrease a moiré phenomenon, thereby improving visibility.

It is preferable that an angle α of the first electrode line 121 with respect to the X axis direction of the base substrate 110 is in the range of $18°\leq\alpha\leq72°$ (See FIG. 6). In addition, an angle β of the second electrode line 131 with respect to the X axis direction of the base substrate 110 is in the range of $108° \leq \beta \leq 162°$ (See FIG. 7). Here, when intersection points between the first and second electrode lines 121 and 131 are connected to each other, a gradient is formed in an oblique line form (See FIG. 4). As a result, the moiré phenomenon is decreased.

It is preferable an absolute value $|\alpha-(180°-\beta)|$ of a difference between the angle α of the first electrode line 121 with respect to the X axis direction of the base substrate 110 and a value obtained by subtracting the angle β of the second electrode line 131 with respect to the X axis direction of the base substrate 110 from 180° is smaller than 60°. This is to decrease the moiré phenomenon. It is preferable that when the angle α of the first electrode line 121 with respect to the X axis direction of the base substrate 110 is 72°, the angle β of the second electrode line 131 is not 108° and the angles α and β are selected so that α and (180−β) are different from each other. This is to allow the first and second electrode lines 121 and 131 to intersect with each other to conduct electricity, thereby obtaining X and Y coordinates. In addition, the first and second electrode lines 121 and 131 intersect with each other, thereby decreasing the moiré phenomenon. Here, the angles α and β of the first and second electrode lines 121 and 131 may be exchanged with each other.

It is preferable an absolute value $|\alpha-(180°-\beta)|$ of a difference between the angle α of the first electrode line 121 with respect to the X axis direction of the base substrate 110 and a value obtained by subtracting the angle β of the second electrode line 131 with respect to the X axis direction of the base substrate 110 from 180° is smaller than 40°. It is preferable that when the angle α of the first electrode line 121 with respect to the X axis direction of the base substrate 110 is 64°, the angle β of the second electrode line 131 is not 116° and the angles α and β are selected so that α and (180−β) are different from each other.

The number of each of first electrode lines 121/second electrode lines 131 may be adjusted depending on a size of the active region of the base substrate 110 or a pitch of each of the first electrode lines 121/the second electrode lines 131 adjacent to each other. It is preferable that the pitch of each of the first and second electrode lines 121 and 131 is 100 to 800 μm and a width of each of the electrodes having a straight line shape is 0.5 to 10 μm.

The first and second electrode lines 121 and 131 of the electrode patterns 120 and 130 may be formed by selectively etching a metal thin film formed by a dry process such as a sputtering process, an evaporation process, or the like, a wet process such as a dip coating process, a spin coating processing, a roll coating process, a spray coating process, or the like, or be formed by a direct patterning process such as a screen printing process, a gravure printing process, an inkjet printing process, or the like.

Meanwhile, the touch sensor 100 according to the exemplary embodiment of the present disclosure includes the electrode wirings 150 and 160 formed at edges of the first and second electrode patterns 120 and 130 formed on the base substrate 110, that is, the bezel region of the base substrate 110, and receiving an electrical signal from the first and second electrode patterns 120 and 130 (See FIGS. 1 and 2). The electrode wirings 150 and 160 may be printed by a screen printing process, a gravure printing process, an inkjet printing process, or the like. Particularly, according to the exemplary embodiment of the present disclosure, the electrode patterns 120 and 130 and the electrode wirings 150 and 160 may be simultaneously printed. In addition, as a material of the electrode wirings 150 and 160, a material including silver (Ag) paste or organic silver that has excellent electrical conductivity may be used. However, the present disclosure is not limited thereto. That is, a conductive polymer, a carbonblack (including CNT), a metal oxide such as an ITO, a low resistance metal such as metals, or the like, may be used as the material of the electrode wirings. As shown in FIGS. 1 and 2, the first electrode wirings 150 are extended from one end or the other end of the first electrode pattern 120 (See FIG. 1) and the second electrode wirings 160 are extended from one end or the other end of the second electrode pattern 130 (See FIG. 2). More specifically, at least two first electrode lines 121 form one set and the first electrode wirings 150 are extended from one end portion or the other end portion of each set to the bezel region on one surface of the base substrate 110. In addition, at least two second electrode lines 131 form one set and the second electrode wirings 160 are extended from one end portion or the other end portion of each set to the bezel region on the other surface of the base substrate 110.

FIG. 8 is a cross-sectional view of a touch sensor according to a second exemplary embodiment of the present disclosure. Hereinafter, the touch sensor according to the second exemplary embodiment of the present disclosure will be described with reference to FIG. 8. However, since a base substrate (first and second base substrates 210 and 230), electrode patterns 120 and 130, and electrode wirings (not shown) of the touch sensor according to the second exemplary embodiment of the present disclosure are the same as those of the touch sensor according to the first exemplary embodiment of the present disclosure described above, a detailed description will be omitted.

In the touch sensor 200, a pair of base substrates 210 and 230 having the electrode patterns 120 and 130 formed on one surface thereof may be adhered to each other by an adhesive 280. That is, the first electrode patterns 120 are formed on one surface of the first base substrate 210, the second electrode patterns 130 are formed on one surface of the second base substrate 230, and the adhesive 280 are entirely formed between one surface of the first base substrate 210 and one surface of the second base substrate 230 to entirely adhere the first and second base substrates 210 and 230 to each other, thereby forming the touch sensor 200. The adhesive 280 serves to adhere the first and second base substrates 210 and 230 to each other, thereby allowing the first and second electrode patterns 120 and 130 to be disposed to face each other. Here, a material of the adhesive 280 is not particularly limited, but may be an optical clear adhesive (OCA).

Meanwhile, the first electrode pattern 120 includes the first electrode lines 121 repeatedly arranged in parallel with each other while having an angle with respect to the X axis direction of the base substrate 110, and the second electrode pattern 130 includes the second electrode lines 121 repeatedly arranged in parallel with each other while having an angle with respect to the X axis direction. The first and second electrode lines 121 and 131 intersect with each other and are projected while having the angle. In addition, a first electrode wiring (not shown) are further formed on one surface of the first base substrate 210 so as to be extended from one end of the first electrode pattern 120, and a second electrode wiring (not shown) is further formed on one surface of the second base substrate 230 so as to be extended from one end of the second electrode pattern 130.

Hereinafter, a touch sensor according to a first modified example of the present disclosure will be described. However, since a base substrate (first and second base substrates 210 and 230), electrode patterns 120 and 130, and electrode wirings (not shown) of the touch sensor according to the first modified example of the present disclosure are the same as those of the touch sensor according to the first exemplary embodiment of the present disclosure described above, a detailed description will be omitted.

In the touch sensor 200 according to the first modified example of the present disclosure, a pair of base substrates 210 and 230 having the electrode patterns 120 and 130 formed on one surface thereof may be adhered to each other by an adhesive 280. That is, the first electrode patterns 120 are formed on one surface of the first base substrate 210, the second electrode patterns 130 are formed on one surface of the second base substrate 230, and the adhesive 280 are formed between an edge of the first base substrate 210 and an edge of the second base substrate 230 to adhere the first and second base substrates 210 and 230 to each other, thereby forming the touch sensor 100. Here, the adhesive 280 serves to adhere the edges of the first and second base substrates 210 and 230 to each other, thereby allowing the first and second electrode patterns 120 and 130 to be disposed to face each other. Here, a material of the adhesive 280 is not particularly limited, but may be an optical clear adhesive (OCA) or a double adhesive tape (DAT).

Meanwhile, the first electrode pattern 120 includes the first electrode lines 121 repeatedly arranged in parallel with each other while having an angle with respect to the X axis direction of the base substrate 110, the second electrode pattern 130 includes the second electrode lines 131 repeatedly arranged in parallel with each other while having an angle with respect to the X axis direction of the base substrate 110, and the first and second electrode lines 121 and 131 intersect with each other and are projected while having the angle. In addition, a first electrode wiring (not shown) are further formed on one surface of the first base substrate 210 so as to be extended from one end of the first electrode pattern 120, and a second electrode wiring (not shown) is further formed on one surface of the second base substrate 230 so as to be extended from one end of the second electrode pattern 130.

Since a base substrate (first and second base substrates 210 and 230), electrode patterns 120 and 130, and electrode wirings (not shown) are the same as those of the touch sensor according to the exemplary embodiment of the present disclosure described above, a detailed description will be omitted.

FIG. 9 is a cross-sectional view of a touch sensor according to a third exemplary embodiment of the present disclosure. Hereinafter, the touch sensor according to the third exemplary embodiment of the present disclosure will be described with reference to FIG. 9. However, since a base substrate (first and second base substrates 210 and 230), electrode patterns 120 and 130, and electrode wirings (not shown) of the touch sensor according to the third exemplary embodiment of the present disclosure are the same as those of the touch sensor according to the first exemplary embodiment of the present disclosure described above, a detailed description will be omitted, and structures of first and second electrode lines 121 and 131 will be described in detail.

The base substrate 110 has first electrode patterns 120 formed on one surface thereof and second electrode patterns 130 formed on the other surface thereof. The first electrode patterns 120 have first and third electrode lines 121 and 123 electrically connected to each other and forming predetermined patterns and are electrically connected to each other. In addition, the second electrode patterns 130 have second and fourth electrode lines 131 and 133 electrically connected to each other and forming predetermined patterns and are electrically connected to each other.

In the first and second electrode patterns 120 and 130, meshes having various shapes are formed. In the touch sensor 100 according to the third exemplary embodiment of the present disclosure, a diamond shaped mesh will be described. The first and second electrode lines 121 and 123 intersect with each other and are formed in a diamond shape. The first electrode lines 121 are formed to have a gradient in the X axis direction, and the third electrode lines 123 are formed to have a gradient in the Y axis direction (See FIG. 10). The first and third electrode lines 121 and 123 intersect with each other to form diamond meshes. Here, the diamond mesh is formed to be inclined with respect to the X axis direction by a predetermined angle. In the diamond mesh, distances from the X axis direction of the base substrate to intersection points between the first and second electrode lines 121 and 123 are different.

The diamond meshes of the first electrode patterns 120 have different angles with respect to the X axis direction of the base substrate. An angle $\alpha$ of the first electrode line 121 with respect to the X axis direction of the base substrate is in the range of $18°\leq\alpha\leq72°$, and an angle $\beta$ of the third electrode line 123 with respect to the X axis direction of the base substrate is in the range of $108°\leq\beta\leq162°$. This is to form the first and third electrode lines 121 and 123 in the diamond mesh shapes and allow the first and third electrode lines 121 and 123 to intersect with each other in an oblique line form to decrease the moiré phenomenon.

It is preferable an absolute value $|\alpha-(180°-\beta)|$ of a difference between the angle $\alpha$ of the first electrode line 121 with respect to the X axis direction of the base substrate and a value obtained by subtracting the angle $\beta$ of the third electrode line 123 with respect to the X axis direction of the base substrate from 180° is smaller than 60°. This is to decrease the moiré phenomenon. It is preferable that when the angle $\alpha$ of the first electrode line 121 with respect to the X axis direction of the base substrate 110 is 72°, it is preferable that the angle $\beta$ of the third electrode line 123 is not 108° and the angles $\alpha$ and $\beta$ are selected so that $\alpha$ and $(180-\beta)$ are different from each other. This is to allow the first and third electrode lines 121 and 123 to intersect with each other to obtain meshes having a diamond shape.

It is preferable an absolute value $|\alpha-(180°-\beta)|$ of a difference between the angle $\alpha$ of the first electrode line 121 with respect to the X axis direction of the base substrate and a value obtained by subtracting the angle $\beta$ of the third electrode line 123 with respect to the X axis direction of the base substrate from 180° is smaller than 40°. It is preferable that when the angle $\alpha$ of the first electrode line 121 with respect to the X axis direction of the base substrate 110 is 64°, the angle $\beta$ of the third electrode line 123 is not 116° and the angles $\alpha$ and $\beta$ are selected so that $\alpha$ and $(180-\beta)$ are different from each other.

The diamond meshes of the second electrode patterns 130 have different angles with respect to the X axis direction of the base substrate. An angle $\alpha$ of the fourth electrode line 133 with respect to the X axis direction of the base substrate is in the range of $18°\leq\alpha\leq72°$, and an angle $\beta$ of the second electrode line 131 with respect to the X axis direction of the base substrate is in the range of $108°\leq\beta\leq62°$. That is, the second electrode line 131 has the same angle as that of the third electrode line 123, and the fourth electrode line 133 has the same angle as that of the first electrode line 121. In some cases, the angles $\alpha$ and $\beta$ of the second and fourth electrode lines 131 and 133 may be exchanged with each other.

In this case, when the first and second electrode patterns 120 and 130 are overlapped with each other, the meshes having a diamond shape are maintained. That is, the first and fourth electrode lines 121 and 133 are in parallel with each other, and the second and third electrode lines 131 and 123 are in parallel with each other. This is to dispose intersection points between the first and second electrode patterns 120 and 130 in an oblique line form while maintaining the first and second electrode patterns 120 and 130 in the diamond shape. Further, the intersection points are disposed in the oblique line form, thereby making it possible to decrease the moiré phenomenon and simplify an aligning process of the meshes having the diamond shape.

The number of each of first electrode lines 121/second electrode lines 131 may be adjusted depending on a size of the active region of the base substrate 110 or a pitch of each of the first electrode lines 121/the second electrode lines 131 adjacent to each other. It is preferable that the pitch of each of the first and second electrode lines 121 and 131 is 100 to 800 μm and a width of each of the electrodes having a straight line shape is 0.5 to 10 μm.

As set forth above, according to the exemplary embodiments of the present disclosure, the moiré phenomenon generated due to line overlapping between upper and lower electrode patterns of the base substrate in a process of projecting an image may be significantly decreased.

In addition, an aligning process of X axis electrode patterns and Y axis electrode patterns is simplified, thereby making it possible to decrease the moiré phenomenon.

Further, an aligning process of X axis electrode patterns and Y axis electrode patterns in a mesh shape is simplified, thereby making it possible to decrease the moiré phenomenon.

Furthermore, according to the exemplary embodiment of the present disclosure, line overlapping between the electrode patterns formed on the base substrate and pixel lattices or a black matrix formed in a color filter is minimized, thereby making it possible to improve visibility.

Although the exemplary embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the disclosure.

Accordingly, any and all modifications, variations or equivalent arrangements should be considered to be within the scope of the disclosure, and the detailed scope of the disclosure will be disclosed by the accompanying claims.

What is claimed is:

1. A touch sensor comprising:
   a base substrate;
   a first electrode pattern formed on the base substrate and including first electrode lines repeatedly arranged in parallel with each other; and
   a second electrode pattern formed on a surface spaced apart from a surface on which the first electrode pattern is formed and including second electrode lines intersecting with the first electrode lines and repeatedly arranged in parallel with each other,
   wherein an extension line connecting intersection points between the first and second electrode lines to each other is formed as an oblique line with respect to a horizontal direction.

2. The touch sensor of claim 1, wherein the first electrode lines are formed on one surface of the base substrate, and the second electrode lines are formed on the other surface of the base substrate.

3. The touch sensor of claim 1, wherein the base substrate includes:
   a first base substrate having the first electrode lines formed thereon;
   a second base substrate facing the first base substrate and having the second electrode lines formed thereon.

4. The touch sensor of claim 1, wherein an absolute value $|\alpha-(180°-\beta)|$ of a difference between an angle $\alpha$ of the first electrode line with respect to an X axis direction and a value obtained by subtracting an angle $\beta$ of the second electrode line with respect to the X axis direction from 180° is smaller than 60°.

5. The touch sensor of claim 4, wherein the angle $\alpha$ of the first electrode line with respect to the X axis direction is in the range of $18°\leq\alpha\leq72°$.

6. The touch sensor of claim 5, wherein the angle $\beta$ of the second electrode line with respect to the X axis direction of the base substrate is in the range of $108°\leq\beta\leq162°$.

7. The touch sensor of claim 1, further comprising:
   a first electrode wiring formed on one surface of the base substrate and extended from one end of the first electrode pattern; and
   a second electrode wiring formed on the other surface of the base substrate and extended from one end of the second electrode pattern.

8. A touch sensor comprising:
   a base substrate;
   a first electrode pattern formed on the base substrate and formed of a plurality of first electrode lines spaced apart from each other in parallel with each other and a plurality of third electrode lines spaced apart from each other in parallel with each other so as to intersect with the first electrode lines;
   a second electrode pattern formed on a surface spaced apart from a surface on which the first electrode pattern is formed and formed of a plurality of second electrode lines spaced apart from each other in parallel with each other and a plurality of fourth electrode lines spaced apart from each other in parallel with each other so as to intersect with the second electrode lines,
   wherein the first and second electrode patterns intersect with each other to form intersection points at which the first and third electrode lines and the second and fourth electrode lines intersect with each other, and a gradient is formed in an oblique line form when the intersection points are connected to each other.

9. The touch sensor of claim 8, wherein the first electrode pattern is formed on one surface of the base substrate, and the second electrode pattern is formed on the other surface of the base substrate.

10. The touch sensor of claim 9, wherein the base substrate includes:
    a first base substrate having the first electrode pattern formed thereon;
    a second base substrate coupled to the first base substrate so as to face the first base substrate and having the second electrode pattern formed thereon.

11. The touch sensor of claim 9, wherein the first and second electrode pattern is a mesh shape which is a diamond shape.

12. The touch sensor of claim 9, wherein in the first and second electrode patterns, an absolute value $|\alpha-(180°-\beta)|$ of a difference between an angle $\alpha$ of the first electrode line with respect to an X axis direction of the base substrate and a value obtained by subtracting an angle $\beta$ of the third electrode line with respect to the X axis direction of the base substrate from 180° is smaller than 60°.

13. The touch sensor of claim 12, wherein the angle $\alpha$ of the first electrode line with respect to the X axis direction of the base substrate is in the range of $18°\leq\alpha\leq72°$.

14. The touch sensor of claim 12, wherein the angle $\beta$ of the third electrode line with respect to the X axis direction of the base substrate is in the range of $108°\leq\beta\leq162°$.

* * * * *